(12) United States Patent
Amellal et al.

(10) Patent No.: US 6,990,998 B1
(45) Date of Patent: Jan. 31, 2006

(54) FUEL TANK AND FUEL FLOW CONTROL DEVICE

(75) Inventors: Karim Amellal, Tecumseh (CA);
Benedict R. Bonazza, Lapeer, MI (US);
George Earl Maroney, Kingston, MI (US); Steve L. Toth, Windsor (CA)

(73) Assignee: TI Group Automotive Systems, L.L.C., Warren, MI (US)

( * ) Notice: Subject to any disclaimer, the term of this patent is extended or adjusted under 35 U.S.C. 154(b) by 0 days.

(21) Appl. No.: 10/930,125

(22) Filed: Aug. 31, 2004

Related U.S. Application Data

(62) Division of application No. 10/624,863, filed on Jul. 22, 2003, now Pat. No. 6,807,952.

(51) Int. Cl.
*E03B 3/18* (2006.01)
*E03B 11/00* (2006.01)

(52) U.S. Cl. .................. 137/547; 137/578; 137/592
(58) Field of Classification Search ............... 123/518, 123/516, 514, 509; 137/590, 592, 578, 544, 137/547
See application file for complete search history.

(56) References Cited

U.S. PATENT DOCUMENTS

| | | | | |
|---|---|---|---|---|
| 1,007,009 A | * | 10/1911 | Rothchild et al. | .......... 137/447 |
| 1,349,751 A | * | 8/1920 | Cross | .......... 406/136 |
| 2,367,055 A | * | 1/1945 | Rike et al. | .......... 137/563 |
| 4,224,167 A | * | 9/1980 | Buttigieg | .......... 210/460 |
| 5,630,445 A | * | 5/1997 | Horiuchi et al. | .......... 137/592 |
| 5,640,994 A | * | 6/1997 | Jacobsen | .......... 137/592 |
| 5,971,036 A | * | 10/1999 | Rehmer et al. | .......... 141/1 |
| 6,000,426 A | * | 12/1999 | Tuckey et al. | .......... 137/588 |
| 6,058,968 A | * | 5/2000 | Carter | .......... 137/561 A |

FOREIGN PATENT DOCUMENTS

DE 019530256 C1 * 1/1997

* cited by examiner

*Primary Examiner*—A. Michael Chambers
(74) *Attorney, Agent, or Firm*—Reising, Ethington, Barnes, Kisselle, P.C.

(57) ABSTRACT

A fuel tank assembly has a fuel tank with a fuel flow control device disposed at least partially in the fuel tank, and which communicates with a fuel filler pipe through which volatile fuel is added to the fuel tank. In one embodiment, the fuel flow control device includes a fill tube that controls the manner in which fuel enters the fuel tank, preferably to reduce generation of fuel vapor when fuel is added to the fuel tank. In one embodiment, the fill tube is a flexible tube and includes a float adjacent to an outlet end of the fill tube so that the outlet end of the tube is responsive to the level of liquid fuel in the fuel tank for at least some levels of fuel in the fuel tank.

12 Claims, 2 Drawing Sheets

FUEL TANK AND FUEL FLOW CONTROL DEVICE

REFERENCE TO RELATED APPLICATION

This application is a division of U.S. application, Ser. No. 10/624,863, filed Jul. 22, 2003, and issued as U.S. Pat. No. 6,807,952 on Oct. 26, 2004.

FIELD OF THE INVENTION

This invention relates to fuel tanks and more particularly to a fuel tank and fuel flow control device.

BACKGROUND OF THE INVENTION

As concern for the environment increases, regulations for preventing the escape of volatile hydrocarbon vapors to the atmosphere are being promulgated by governmental agencies. One source of hydrocarbon vapors is the fuel tanks of vehicles using gasoline or other hydrocarbon fuels of high volatility. With current automotive fuel tank designs, fuel vapor can escape during the filling of the tanks and usually even after the tank is filled.

The use of an on-board vapor storage container to remove excess fuel vapor from the fuel tank is one solution to this problem. Some of these devices use a high capacity or high flow rate valve to control the flow of vapor from the fuel tank to a vapor storage canister. From the storage canister, the vapor may be fed into the intake manifold of the engine to be consumed by the engine.

Current on-board vapor recovery systems send essentially all the vapor removed from the fuel tank to the vapor canister. This can produce a high flow rate of fuel vapor to the vapor canister requiring a large vapor canister which increases the cost of the vapor recovery system.

SUMMARY OF THE INVENTION

A fuel tank assembly has a fuel tank with a fuel flow control device disposed at least partially in the fuel tank, and which communicates with a fuel filler pipe through which fuel is added to the fuel tank. In one embodiment, the fuel flow control device includes a fill tube that controls the manner in which fuel enters the fuel tank, preferably to reduce generation of fuel vapor when fuel is added to the fuel tank. In one presently preferred embodiment, the fill tube is constructed and arranged so that fuel exits therefrom generally at the surface level of fuel in the fuel tank. In the embodiment disclosed herein, this is accomplished by providing the fill tube as a flexible tube and including a float adjacent to an outlet end of the fill tube, so that the outlet end of the tube is responsive to the level of fuel in the fuel tank for at least some levels of fuel in the fuel tank.

In another presently preferred embodiment, the fuel flow control device includes a diffuser through which fuel flows. Preferably, the flow area of the diffuser increases as it extends downstream, decreasing flow velocity and increasing pressure to reduce fuel vapor generation and encourage condensation of fuel vapor. Desirably, the diffuser can also function as a fuel filter. The diffuser can be used with a fill tube, and may be maintained generally in the area of the surface level of fuel in the fuel tank, along with an outlet end of a fill tube, if used with a fill tube. With the diffuser on the bottom of the tank the hydrostatic pressure can increase the condensation of vapor.

Some objects, features and advantages of the presently preferred embodiments of the invention include providing a fuel tank assembly and fuel flow control device that reduce fuel vapor generation during refueling of a fuel tank, permit use of a smaller vapor canister, permit use of a lower cost vapor canister, reduce hydrocarbon emissions, reduce premature shut-off of a refueling nozzle, reduce spit back during refueling, can provide an additional or alternative source of fuel filtration, and are of relatively simple design and economical manufacture and assembly.

The above noted objects, features and advantages are not intended to be complete, but rather, are merely illustrative of certain aspects of some presently preferred embodiments of the invention. Accordingly, in practicing the invention none, some, all and/or other objects and advantages may be achieved.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
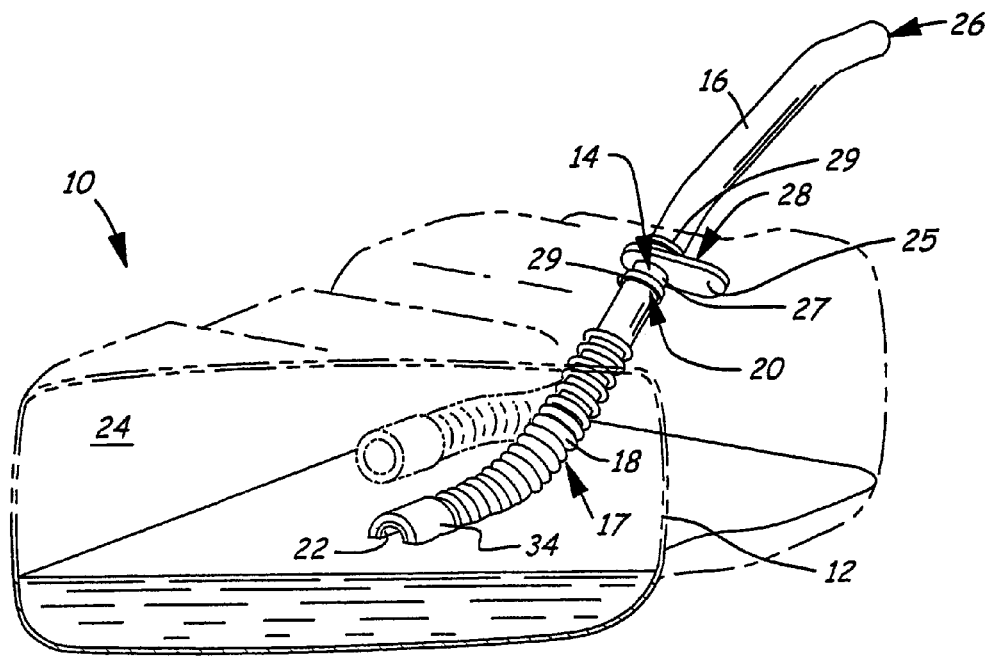
FIG. 1 illustrates a fuel tank assembly having a fill tube received within a fuel tank in accordance with a first presently preferred embodiment of the invention.
Figure 2:
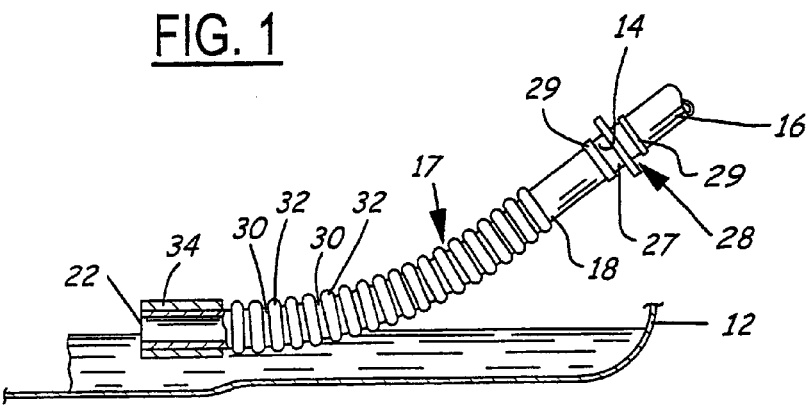
FIG. 2 is a fragmentary sectional view of the fuel tank assembly of FIG. 1.

Referring in more detail to the drawings, FIGS. 1–2 illustrate one presently preferred embodiment of a fuel tank assembly 10 including a fuel tank 12 having an opening 14 that communicates a vehicle fuel filler pipe 16 with a fuel flow control device 17 disposed at least partially in the fuel tank 12. The fuel flow control device 17 includes a fill tube 18 with an inlet end 20 that communicates with the fuel filler pipe 16 through the opening 14, and an outlet end 22 generally open to the interior 24 of the fuel tank 12. The opening 14 may be defined in a flange 25 carried by the fuel tank 12 and having tube connectors 27 on opposed sides on which the fuel filler pipe 16 and fill tube 18 are received, and preferably secured by clamps 29.

The fuel filler pipe 16 preferably extends from the fuel tank 12 to a location accessible from the exterior of the vehicle in which the fuel tank is received. To add fuel to the fuel tank 12, a refueling nozzle from a refueling station, or "gas station," is inserted in an inlet end 26 of the fuel filler pipe 16 and fuel is discharged from the nozzle into the fuel filler pipe 16. Fuel exits the fuel filler pipe 16 at its outlet end 28, travels through the opening 14 in the fuel tank, and then through the fill tube 18 into the interior 24 of the fuel tank 12.

The fill tube 18 is preferably flexible and responsive to the level of fuel in the fuel tank 12 so that its outlet 22 end remains in the area of the surface level of the fuel in the tank for at least some, and preferably all levels of fuel in the tank. As shown, the fill tube 18 is a generally flexible cylindrical tube, although the fill tube could be formed in substantially any shape, size or arrangement. As shown, the fill tube 18 is made flexible by providing flexible polymeric segments 30 between more ridged structural polymeric segments 32, although any arrangement of the fill tube 18 can be provided which enables the outlet end 22 of the fill tube 18 to be responsive to the level of fuel in the fuel tank 12.

To enable the outlet end 22 of the fill tube 18 to be responsive to the level of fuel in the fuel tank 12, a float 34 is disposed adjacent to the outlet end 22 of the fill tube 18. The float 34 is made of material that is buoyant in liquid fuel, and is shown as an annular, hollow body disposed around the outlet end 22 of the fill tube 18. However, the float 34 may take on substantially any shape or size sufficient to cause the outlet end 22 of the fill tube 18 to float in liquid fuel and be responsive to the level of fuel in the fuel tank. Desirably, the float 34 maintains at least a portion of the outlet end 22 of the fill tube 18 at least partially above the level of fuel in the fuel tank 12 so that fuel discharged from the fill tube 18 can be dispersed generally along the surface of the fuel. Desirably, this can reduce the turbulence of the fuel and may also reduce droplet formation resulting in the reduction of fuel vapor generation. As shown, the float 34 maintains the outlet end 22 of the fill tube 18 partially submerged in liquid fuel and partially above the surface level of the fuel. While the first presently preferred embodiment of the invention has been described as including a float 34 on the fill tube 18, the fill tube 18 itself could be made buoyant and responsive to the level of fuel in the fuel tank. For example, part or all of the fill tube can be made of a material that is buoyant in liquid fuel. And a float may be used with a fill tube that is itself buoyant or semi-buoyant in liquid fuel.

Figure 3:
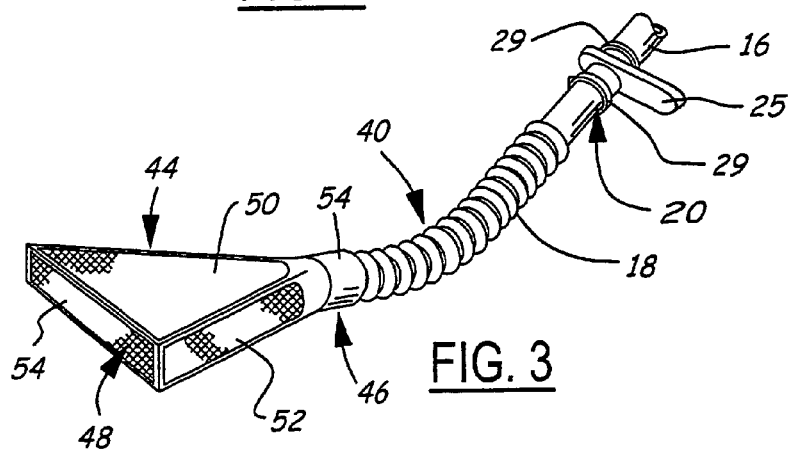
FIG. 3 is a perspective view of a fill tube according to a second presently preferred embodiment of the invention.
Figure 4:
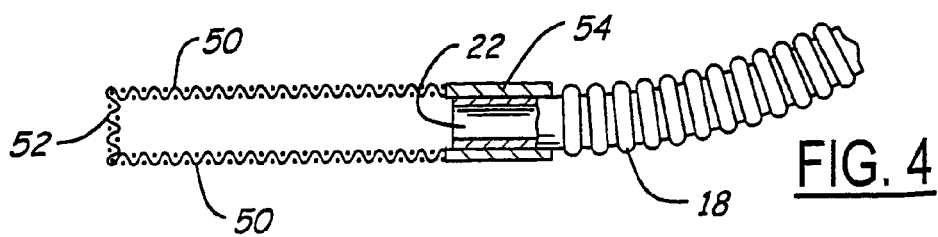
FIG. 4 is a fragmentary sectional view of the fill tube of FIG. 3.

A second presently preferred embodiment of a fuel flow control device is illustrated in FIGS. 3 and 4. In this embodiment, the fuel flow control device 40 preferably includes a fill tube 18 that communicates with the fuel filler pipe 16 through the opening 14 in the fuel tank 12, and a diffuser 44 at the outlet end of the tube 18. The diffuser 44 can also be employed without the fill tube 18. The fuel tank 12, fuel filler pipe 16 and fill tube 18 can be constructed substantially as shown and described with reference to the first presently preferred embodiment. Accordingly, the construction and arrangement of these elements will not be described again.

The diffuser 44 has an open inlet end 46 adjacent to and in communication with the outlet end of the fill tube 18, and an outlet end 48 spaced from the inlet end 46. Preferably, the flow area at the inlet end 46 of the diffuser 44 is less than the flow area at the outlet end 48 of the diffuser. As shown, the diffuser 44 has opposed generally triangular shaped end walls 50 separated by interposed side walls 52, although other shapes and arrangements may be employed. The increasing flow area of the diffuser 44 from its inlet end 46 to its outlet end 48 preferably reduces the velocity of fuel flowing therein and increases its pressure to reduce turbulence and encourage condensation of fuel vapors generated during refueling of the tank. The reduction of the velocity of the fuel and the reduction in turbulent flow as fuel is added to the tank reduce the generation of fuel vapor in the tank.

The diffuser 44 is preferably formed from a mesh material that readily permits fuel flow therethrough to avoid undue restriction to fuel entering the fuel tank 12. Preferably, the diffuser 44 inhibits the flow of fuel vapor therethrough, and fuel vapor captured within the diffuser 44 may be condensed into liquid fuel by the increasing pressure within the diffuser 44 and its integration and contact with the flow of fuel through the diffuser. Then, after the fuel vapor is condensed into liquid fuel, it passes through the diffuser 44 and into the fuel tank 12. Accordingly, less fuel vapor is present within the fuel tank 12.

The diffuser 44 may be in the form of a mesh material and may be rigid like a metal or plastic screen, or may be more flexible, like a thin porous plastic material or a cloth-like material. The material of the diffuser 44 is preferably a mesh with an average pore size in the range of about 10 microns to 100 microns. Desirably, the diffuser 44 may act as an initial filter to reduce impurities and contaminants within the fuel, which may extend the life of downstream filters such as those at a fuel pump or downstream thereof. The diffuser material may also provide sufficient filtration of fuel such that one or more downstream fuel filters can be eliminated. As shown in FIG. 4, the mesh material of the diffuser 44 may be attached to a collar 54 which is fitted over the outlet end 22 of the fill tube 18. Of course, the diffuser 44 can be mounted on or carried by the fill tube in other ways, and as mentioned above, the diffuser 44 can be used without any fill tube 18. The diffuser 44, and or the fill tube 18, may be buoyant in liquid fuel or a float 34 (FIGS. 1 and 2) may be associated with either the diffuser 44, or the tube 18, or both so that the outlet end of the tube 18 and diffuser 44 are responsive to the level of liquid fuel in the fuel tank 12. The diffuser 44 may also be constructed to be submerged within the liquid fuel in the tank without being responsive to the level of fuel in the tank.

Figure 5:
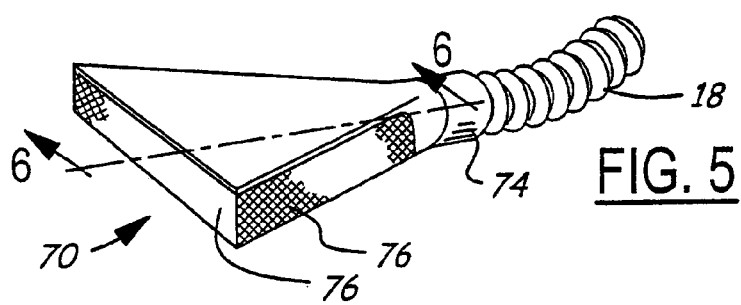
FIG. 5 is a fragmentary perspective view of a fill tube according to a third presently preferred embodiment of the invention.
Figure 6:
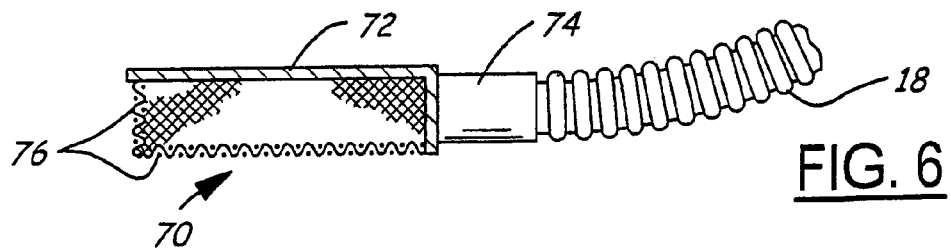
FIG. 6 is a sectional view taken generally along line 6—6 in FIG. 5.

A third presently preferred embodiment of a fuel flow control device is shown in FIGS. 5 and 6. In this embodiment, fill tube 18, fuel tank 12 and fuel filler pipe 16 are substantially as previously described, and therefore will not be described again. In this embodiment, the diffuser 70 has a rigid wall 72 that is preferably integral with a collar 74 received over the outlet end of the fill tube 18. In the embodiment shown, the upper wall 72 of the diffuser 70 is solid, although other surfaces can be formed from a solid material as desired. The remaining surfaces 76 of the diffuser 70 may be of substantially any material that is permeable to liquid fuel, as described above with reference to the second embodiment. The solid surfaces of the diffuser 70 help to control the flow of fuel, and providing the upper wall 72 in solid or imperforate form helps to further inhibit the escape of fuel vapor from the diffuser 70. Again, the diffuser 70 may be used with or without a fill tube, and may or may not be responsive to the level of fuel in the fuel tank, or otherwise maintained in the area of the surface level of the fuel in the fuel tank.

Figure 7:
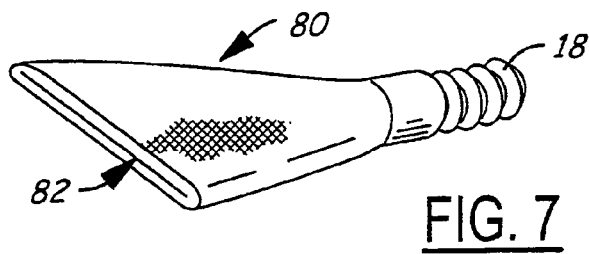
FIG. 7 is a fragmentary perspective view of a fill tube according to a fourth presently preferred embodiment of the invention showing a diffuser in its closed position.
Figure 8:
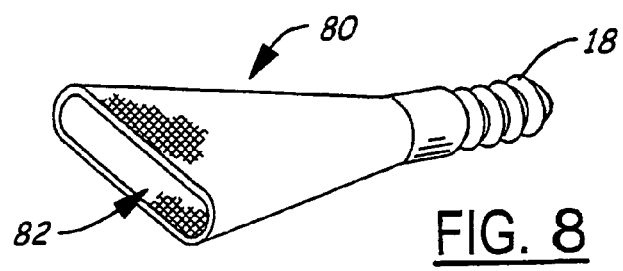
FIG. 8 is a fragmentary perspective view of the fill tube shown in FIG. 7 with the diffuser shown in its open position.

A fourth presently preferred embodiment of a fuel flow control device is shown in FIGS. 7 and 8. In this embodiment, the diffuser 80 is preferably formed of a mesh like material as described above, and has a duck bill outlet end 82. As shown in FIG. 7, when fuel is not flowing through the diffuser 80, the outlet end 82 folds generally flat into a closed position. As shown in FIG. 8, when fuel is flowing through the diffuser 80 the outlet end 82 moves into its open position. This construction and arrangement of the diffuser 80 will reduce the restriction to fuel flow through the diffuser to avoid interference with the refueling process. The diffuser 80 is preferably made of a material that is permeable to liquid fuel while inhibiting the flow of fuel vapor therethrough. Any suitable material may be used, as discussed above. Again, the diffuser 80 may be used with or without a fill tube, and may or may not be responsive to the level of fuel in the fuel tank, or otherwise maintained in the area of the surface level of the fuel in the fuel tank.

Persons of ordinary skill in the art will readily recognize that the preceding description of the presently preferred embodiments of the invention is illustrative of the preferred embodiments, and is not intended to limit the invention. Various modifications and substitutions can be made without departing from the spirit and scope of the invention which is defined by the following claims. For example, while the diffuser has been shown in several embodiments with a generally triangular or pyramidal shape, it may take on substantially any shape and size, including spherical, semispherical, cylindrical, and conical to name a few. Also by way of example and without limitation, the diffuser and the flexible tube may be integrally formed. Still other modifications and/or substitutions will be apparent to those of ordinary skill in the art.

We claim:

1. A fuel flow control device for a fuel tank having an interior constructed to contain a supply of fuel, comprising:
a diffuser having a housing disposed in the fuel tank and having an inlet through which fuel is received and an outlet spaced from the inlet and constructed for communication with the interior of the fuel tank such that fuel added to the fuel tank flows through the diffuser, the diffuser housing having a flow area which increases as it extends downstream of the inlet to diffuse liquid fuel flowing through the inlet and at its outlet a flow area substantially greater than the flow area at its inlet.

2. The fuel flow control device of claim 1 wherein the diffuser housing is formed at least in part from a material permeable to liquid fuel so that liquid fuel may flow through the diffuser.

3. The fuel flow control device of claim 1 wherein the diffuser housing is formed at least in part of a material that permits liquid fuel flow therethrough but at least substantially prevents contaminants greater than a predetermined size from flowing out of the diffuser housing.

4. The fuel flow control device of claim 3 wherein the diffuser housing is formed at least in part from a mesh material having pores with an average size in the range of 10 to 100 microns.

5. The fuel flow control device of claim 1 wherein the diffuser housing has at least one wall that is imperforate and does not permit fuel flow therethrough.

6. The fuel flow control device of claim 5 wherein said at least one wall that is imperforate is an upper wall of the diffuser housing.

7. The fuel flow control device of claim 1 wherein an outlet end of the diffuser housing has a duckbill outlet which is substantially open to the interior of the fuel tank when liquid fuel flows through the diffuser housing and folds generally flat into a closed position when fuel is not flowing through the diffuser housing.

8. The fuel flow control device of claim 1 wherein the diffuser housing is formed at least in part of a material that readily permits liquid fuel flow therethrough while inhibiting the flow of fuel vapor therethrough.

9. The fuel flow control device of claim 1 which also comprises a fill tube having an inlet end through which fuel to be added to the fuel tank is received and an outlet end downstream of the inlet end adapted to communicate with the interior of the fuel tank through the diffuser housing, and wherein the diffuser housing is carried by the fill tube adjacent to its outlet end.

10. The fuel flow control device of claim 1 wherein the diffuser housing comprises an upper wall which is imperforate and at least one other wall formed at least in part of a mesh material with an average pore size in the range of about 10 microns to 100 microns, and the mesh material readily permits liquid fuel flow therethrough and inhibits the flow of fuel vapor therethrough.

11. The fuel flow control device of claim 1 wherein the diffuser housing comprises at least in part a mesh material having pores with an average size in the range of 10 microns to 100 microns, the mesh material permits liquid fuel to readily flow therethrough and inhibits the flow of fuel vapor therethrough, and an outlet end of the diffuser housing has a duckbill outlet which folds generally flat into a closed position when the fuel is not flowing through the diffuser housing and substantially opens to the interior of the fuel tank when liquid fuel flows through the diffuser housing.

12. The fuel flow control device of claim 1 wherein the diffuser housing is constructed so that it is not buoyant in liquid fuel and is normally submerged within liquid fuel in a fuel tank when the level of liquid fuel in the tank is sufficient for the diffuser housing to be submerged in the liquid fuel.

* * * * *